United States Patent [19]

Stohrer, Jr.

[11] Patent Number: 4,553,523

[45] Date of Patent: Nov. 19, 1985

[54] TWO-WAY ADJUSTABLE GRATE AND METHOD FOR ADJUSTING THE LENGTH AND WIDTH

[75] Inventor: Charles E. Stohrer, Jr., Hickory Hills, Ill.

[73] Assignee: Harper-Wyman Company, Hinsdale, Ill.

[21] Appl. No.: 445,202

[22] Filed: Nov. 29, 1982

[51] Int. Cl.⁴ ............................ F24C 1/16; F24B 3/00
[52] U.S. Cl. ............................ 126/9 B; 126/337 R; 126/339; 126/25 R; 126/152 B; 211/175; 211/181; 99/449
[58] Field of Search ............ 126/9 B, 25 R, 30, 38, 126/152 R, 152 B, 153, 336, 337 R, 337 A, 29, 339, 174; 211/134, 175, 181, 153; 108/102, 137; 99/449

[56] References Cited

U.S. PATENT DOCUMENTS

| | | | |
|---|---|---|---|
| 563,467 | 7/1896 | Farwell | 211/153 |
| 718,714 | 1/1903 | Larson | 126/30 X |
| 1,997,432 | 4/1935 | Replogle | 126/339 |
| 2,057,429 | 10/1936 | Heim | 126/339 |
| 2,078,681 | 4/1937 | Otte | 126/339 |
| 2,095,811 | 10/1937 | Goulooze | 126/339 |
| 2,299,885 | 10/1942 | Ellsworth et al. | 126/339 |
| 2,549,709 | 4/1951 | Potts | 99/449 |
| 2,888,305 | 5/1959 | Perry | 108/102 X |
| 3,316,864 | 5/1967 | Maslow | 211/181 X |
| 4,178,844 | 12/1979 | Ward et al. | 211/175 X |
| 4,432,334 | 2/1984 | Holt | 126/9 B |

Primary Examiner—Samuel Scott
Assistant Examiner—Helen Odar
Attorney, Agent, or Firm—Mason, Kolehmainen, Rathburn & Wyss

[57] ABSTRACT

An adjustable grate includes first and second identical grate members each with first and second parallel supports. A plurality of upper and lower elements are secured to and extend perpendicularly to the parallel supports providing a space between the upper and lower elements. The grate is assembled by positioning the second support of each grate member between the upper and lower elements of the opposing grate member. The width of the grate is adjusted by sliding the first and second grate members together or apart. The length of the grate is adjusted by moving an upper end of the first grate member above the upper end of the second grate member until the distance between the upper end of the first grate member and the lower end of the second grate member is the desired length. First and second extension members are then positioned between the first and second supports and the upper and lower elements of each grate member. The first extension member is then extended to a length equal to the distance between the upper end of the second grate member and the upper end of the first grate member and the second extension member is extended to the distance between the lower end of the first grate member and the lower of the second grate member.

15 Claims, 7 Drawing Figures

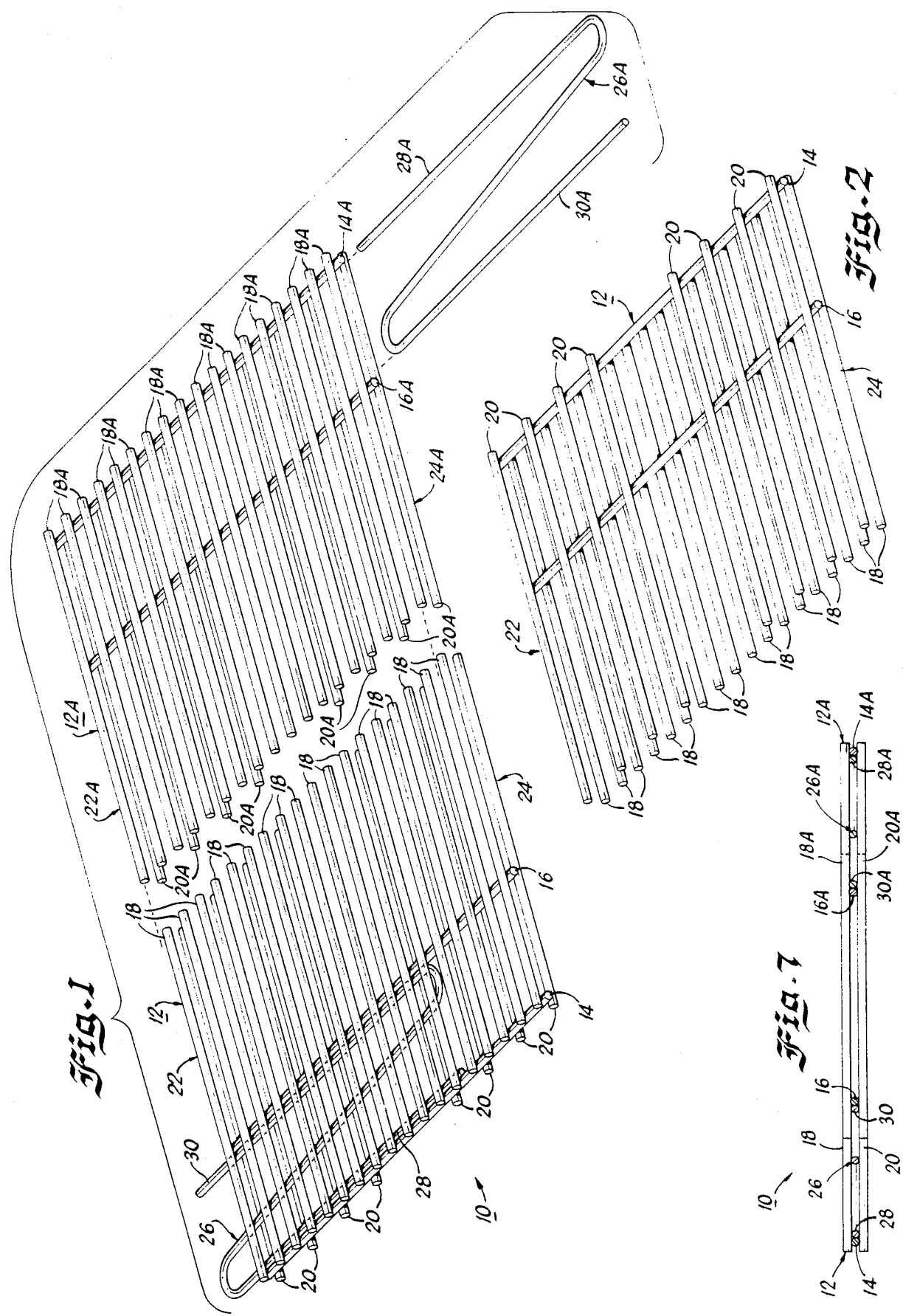

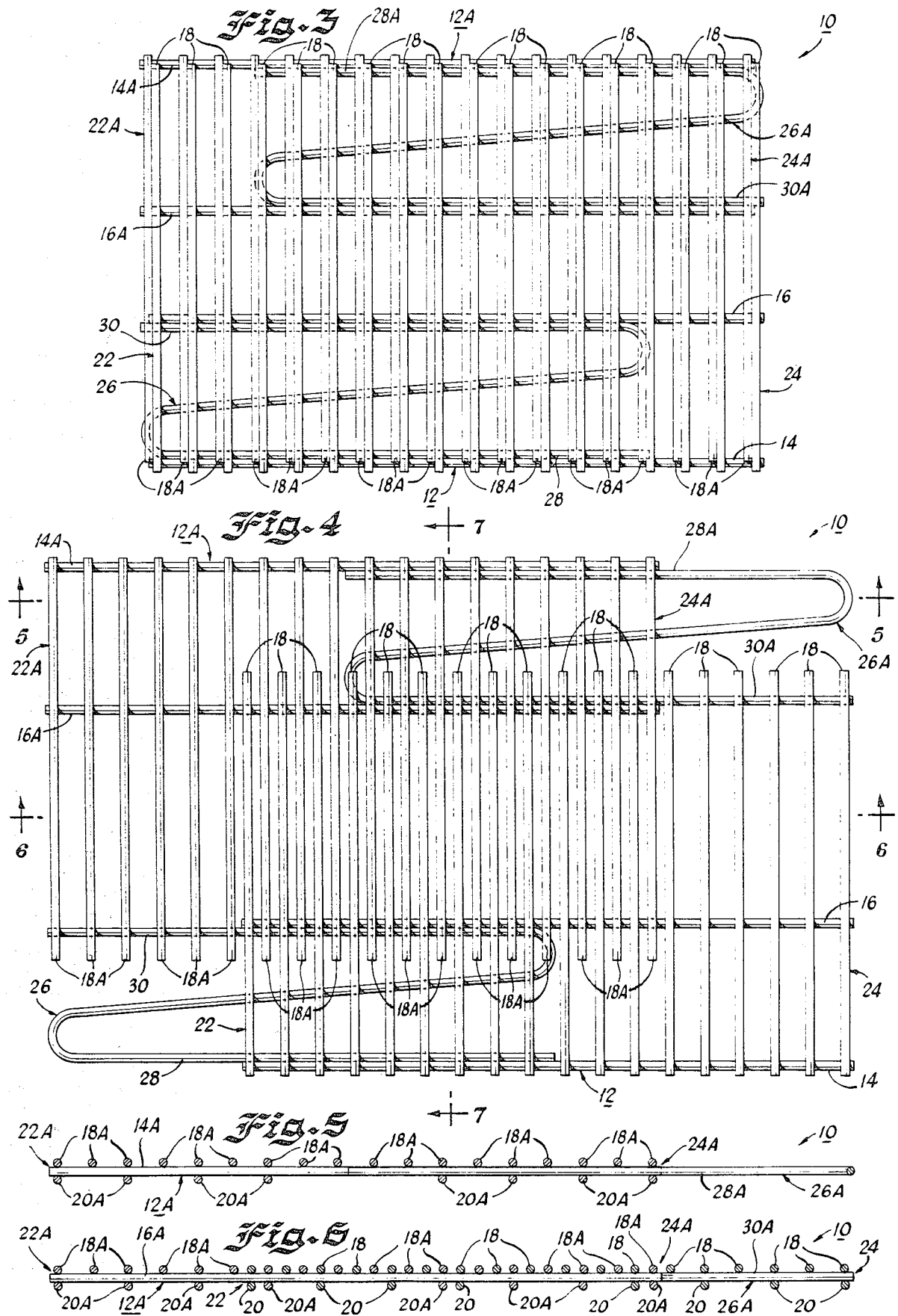

TWO-WAY ADJUSTABLE GRATE AND METHOD FOR ADJUSTING THE LENGTH AND WIDTH

BACKGROUND OF THE INVENTION

1. Field of the Invention

The present invention relates to a new and improved grate the length and width of which may be adjusted and to a new and improved method for adjusting the length and width of the grate.

2. Description of the Background Art

Many outdoor grills employ a flame to heat rocks. The heat from the rocks barbeques meat supported over the rocks. These grills require a grate to support the rock material above the open flame. The varied style, design and configuration of grills necessitates a different configured grate for each grill and a grate adjustable in length and width is desirable. Several adjustable grates, racks and shelves are available but most are adjustable in only a single direction. Examples of one-way adjustable racks, grates and shelves are disclosed in U.S. Pat. Nos. 2,057,429, 2,549,709, 3,673,948 and 4,064,994. Since grates that are only adjustable in a single direction are limited in the number of grill configurations they can accommodate, two-way adjustable grates are desirable. Examples of two-way adjustable grates or racks are disclosed in U.S. Pat. No. 4,178,844 and British Pat. No. 258,117. These grates are only adjustable a limited distance in length and width and due to the manner of adjustment, require multiple parts of different configurations so as not to be interchangeable. These two-way adjustable grates also include large open areas between adjacent members allowing the rocks to fall from the grate.

SUMMARY OF THE INVENTION

An object of the present invention is to provide a new and improved grate for use in a grill or similar device.

Another object of the present invention is to provide a new and improved grate that is adjustable both in length and width.

A further object of the present invention is to provide a new and improved method of adjusting the length and width of a grate.

Briefly, the present invention is directed to a new and improved grate that is two-way adjustable and may be used, for example, to support rock or similar material above an open flame in a variety of different configured gas grills. The grate includes first and second identical grate members defined by first and second parallel support rods and a plurality of upper and lower extending members. Each upper and lower member includes a first end secured to the first support rod and a second end secured a distance from the first end to the second support rod.

A pair of extension members are also included that are S-shaped with two resilient interconnected legs. The extension members are inserted between the upper and lower extending members and between the first and second support rods of each grate members. To assemble the grate, the first and second grate members are aligned with the extending members above and below the second support rod of the opposing grate member. The first and second grate members are then moved together until the desired width of the grate is attained. The length of the grate is adjusted by shifting the first and second grate members relative to each in a direction parallel to the first and second support rods. Once the desired length is attained, the grate members are moved together with the upper and lower extending members passing above and below the second support rods of the opposing grate members. The extension members are then moved into the first and second grate members until the outside end of the extending members are aligned with the ends of the of the grate members filling any open spaces.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 1 is an exploded pictorial view of a grate constructed in accordance with the principles of the present invention;

FIG. 2 is a bottom view of one of the grate members that defines the grate illustrated in FIG. 1;

FIG. 3 is a top view of the grate of the present invention assembled in the smallest width and length;

FIG. 4 is a view similar to FIG. 3 with the grate widened and lengthened;

FIG. 5 is a view taken generally along line 5—5 of FIG. 4;

FIG. 6 is a view taken generally along line 6—6 of FIG. 4; and

FIG. 7 is a view taken generally along line 7—7 of FIG. 4.

DETAILED DESCRIPTION OF A PREFERRED EMBODIMENT

A grate adjustable in both length and width is illustrated in FIGS. 1–7 and generally designated by the reference numeral 10. The grate 10 is defined by two identical grate or rack members 12 and 12A. Since grate members 12 and 12A are identical, only grate member 12 will be described and the corresponding elements of grate member 12A will be designated by a suffix letter "A".

Grate member 12 includes a first support or base member 14 which is an elongated rod. A rod 16 identical to member 14 serves as a second support member parallel to and spaced a predetermined distance from member 14. A plurality of upper support elements 18 are rigidly secured by welding or other means to the upper surfaces of members 14 and 16 and extend perpendicularly to the members 14 and 16. Upper elements 18 are elongated rods identical to the members 14 and 16. Upper elongated elements 18 support rocks or similar material used in gas grills and are spaced apart a distance to prevent the rocks from falling between the upper elements 18.

A plurality of lower support elements or rods 20 are rigidly secured to the lower surfaces of the support rods 14 and 16 by welding or similar means. The lower elements 20 are identical to the upper elements 18 and members 14 and 16, are parallel to elements 18 and extend perpendicularly to members 14 and 16. The lower elements 20 are fewer in number and spaced farther apart than the upper elements 18 since the lower elements 20 do not support rocks or similar material and are primarily intended for securement of the grate members 12 and 12A to each other. The upper 18 and lower 20 elements are spaced apart a distance equal to the diameter of the elements 14 and 16. This spacing is maintained at the free ends of upper 18 and lower 20 elements. This spacing allows grate members 12 and 12A to be brought together to position support member 16 between the free ends of upper 18A and lower 20A elements of grate 12A and position the support member 16A between the free ends of upper 18 and lower 20 elements of grate member 12. As illustrated in FIGS. 4 and 7, once grate members 12 and 12A are in this position, they may be moved toward each other to the desired width of grate 10 (FIG. 4). The narrowest width attainable by the grate 10 is illustrated in FIG. 3 and the widest is illustrated in FIG. 4.

Grate 10 is also adjustable in length as illustrated in FIG. 4. Each grate member 12 and 12A includes an upper end 22, and 22A and a lower end 24 and 24A. To adjust the length of the grate 10, the upper ends 22 and 22A of grate members 12 and 12A are staggered until the distance between the upper end 22A and the lower end 24 is the desired grate length. The grate members 12 and 12A are then joined in the manner previously described. The width of the grate 10 may then be adjusted by moving the grate members 12 and 12A together until the distance between the support elements 14 and 14A are at the desired width.

If the grate 10 has been assembled to the desired width and length as in FIG. 4, there are open spaces above the upper end 22 and outside the free ends of elements 18A and 20A and below the lower end 24A and outside the free ends of elements 18 and 20. These spaces must be filled to prevent rocks or similar material from falling through them during use. These spaces are filled by first 26 and second 26A extension members that are curvilinear. Each extension member 26 and 26A includes first 28, 28A and second 30, 30A legs that are joined together in an S-shaped configuration. The extension members 26 and 26A are rods identical to the rods defining the upper 18, 18A and lower 20, 20A elements and the support members 14, 14A and 16, 16A and are of a dimension allowing them to be slideably positioned between the upper 18, 18A and lower 20, 20A elements and between the support members 14, 14A, 16 and 16A. To fill the open spaces mentioned previously, the extension members 26 and 26A are extended to thereby prevent rocks from falling through these spaces.

What is claimed is:

1. A grate, comprising:
   first and second identical rack members, each said first and second rack member including a base member, a first support secured at a first end to an upper surface of each said base member, each said first support extending perpendicularly from each said base member, and a second support secured at a first end to a lower surface of each said base member, extending perpendicularly from each said base member, said first support being spaced from said second support on said first rack member a sufficient distance to extend above and below, respectively, of said base member on said second rack member allowing said base members of said first and second rack members to be brought toward each other to vary the width of said grate.

2. The grate set forth in claim 1 wherein said first and second supports are parallel.

3. The grate set forth in claim 1 wherein said first and second supports each comprises a plurality of rods, wherein there are fewer rods comprising said second support than said rods comprising said first support and each rod in said second support is aligned between a pair of rods in said first support.

4. The grate set forth in claim 1 wherein each of said first and second rack members further comprises a second base member spaced from said base member and positioned between said first and second supports.

5. The grate set forth in claim 4 wherein said first and second supports of said first rack member are slideably positioned on opposite sides of said second base member of said second rack member and said first and second supports of said second rack member are slideably positioned on opposite sides of said second base member of said first rack member.

6. The grate set forth in claim 1 further comprising a pair of extension members, said extension members including first and second interconnected legs, said extension members slideably positioned adjacent said base member between said first and second supports of each of said first and second rack members.

7. A method for adjusting the length and width of a grate wherein said grate includes first and second identical grate members, each said first and second grate member includes upper and lower ends, each said first and second grate member includes first and second base members, a plurality of upper support elements secured to an upper surface of each of said first and second base members and a plurality of lower support elements secured to a lower surface of each of said first and second base members, said upper and lower support elements each include ends spaced from said first and second base members wherein said ends of said upper support elements are adjacent to and spaced from said ends of said lower support elements, said method for adjusting comprising the steps of:
   aligning said second base member of said first grate member between said ends of said upper and lower support elements of said second grate member,
   aligning said second base member of said second grate member between said ends of said upper and lower support elements of said first grate member, and
   moving said first grate member toward said second grate member to position said first base members of said first and second grate members a predetermined distance apart.

8. The method for adjusting set forth in claim 7, further comprising the step of positioning said upper ends of said first and second grate members at a predetermined distance apart along the length of said first and second base members.

9. The method for adjusting set forth in claim 8 further comprising the steps of inserting a first extension member between said first and second base members and said upper and lower support elements of said first grate member, and inserting a second extension member between said first and second base members and said upper and lower support elements of said second grate member.

10. The method for adjusting set forth in claim 9 further comprising the steps of sliding said first extension member relative to said upper and lower support elements to position at least a portion of said first extension member between said upper end of said first grate member and the upper end of said second grate member, and adjusting the length of said second extension member to the distance between said lower end of said second grate member and the lower end of said first grate member.

11. A grate adjustable both in length and width, comprising:
first and second identical grate members,
each said first and second grate member including first and second parallel base support members,
a plurality of upper elements extending perpendicular to said first and second support members, each said upper element including first and second ends, each said first end secured to said first support member, said second support member secured to each said upper element, and
a plurality of lower elements extending parallel to said upper extending elements and perpendicular to said first and second support members, each said lower element including first and second ends with each of said first ends secured to said first support member, said second support member being secured to each said lower element.

12. The adjustable grate claimed in claim 11 further comprising at least one extension member, said extension member being substantially curvilinear and of a dimension and configuration to allow insertion between said upper and lower elements and between said first and second support members.

13. The adjustable grate claimed in claim 12 wherein said extension member is S-shaped.

14. The adjustable grate claimed in claim 11 wherein said first and second support members and said upper and lower elements each comprise identical rods.

15. The adjustable grate claimed in claim 11 wherein the number of upper elements exceeds the number of lower elements.

* * * * *